United States Patent
Berger

(10) Patent No.: US 6,718,645 B2
(45) Date of Patent: Apr. 13, 2004

(54) MEASURING TOOL AND ADJUSTING TOOL FOR AMMUNITION

(76) Inventor: Heinz Berger, Birchbuehl, CH-3615 Heimenschwand (CH)

( * ) Notice: Subject to any disclaimer, the term of this patent is extended or adjusted under 35 U.S.C. 154(b) by 0 days.

(21) Appl. No.: 10/307,730

(22) Filed: Dec. 2, 2002

(65) Prior Publication Data

US 2003/0126754 A1 Jul. 10, 2003

Related U.S. Application Data

(63) Continuation-in-part of application No. 10/158,043, filed on May 28, 2002.

(51) Int. Cl.$^7$ ............... G01B 5/00; G01B 5/02
(52) U.S. Cl. ............... 33/506; 33/550; 33/551; 33/555
(58) Field of Search ............... 33/506, 542, 543, 33/549, 550, 551, 555, 555.1, 555.2

(56) References Cited

U.S. PATENT DOCUMENTS

| | | | | |
|---|---|---|---|---|
| 2,553,704 A | * | 5/1951 | Eckel | 33/506 |
| 3,209,461 A | * | 10/1965 | Wilson | 33/506 |
| 3,510,951 A | * | 5/1970 | Dow | 33/506 |
| 3,780,438 A | * | 12/1973 | Styczynski | 33/506 |
| 3,859,728 A | * | 1/1975 | Shutt | 33/506 |
| 4,248,132 A | * | 2/1981 | Blomseth | 33/506 |
| 4,608,762 A | * | 9/1986 | Varner | 33/506 |
| 4,679,330 A | * | 7/1987 | Williams | 33/550 |
| 4,918,825 A | * | 4/1990 | Lesh et al. | 33/506 |
| 5,170,569 A | * | 12/1992 | Anderson | 33/506 |
| 5,208,996 A | * | 5/1993 | Schaldach | 33/555 |
| 5,301,436 A | | 4/1994 | Johnston | 33/506 |
| 5,533,272 A | * | 7/1996 | Bagwell | 33/506 |
| 5,570,513 A | * | 11/1996 | Peterson | 33/506 |

* cited by examiner

Primary Examiner—Diego Gutierrez
Assistant Examiner—Madeline Gonzalez
(74) Attorney, Agent, or Firm—Foley & Lardner

(57) ABSTRACT

A measuring device for measuring the concentricity of cartridges (30, 31), more particularly rifle cartridges, is essentially composed of a main body (1) provided with chambers (2) for cartridges of one or a plurality of calibers. The cartridges are radially retained in the chambers by so-called diameter compensators (9) but rotatable about their longitudinal axis. In the area of the point (39) of the projectile, an access for a measuring means (3) is provided, e.g., a dial gauge, the latter indicating the deviation of the projectile from perfect concentricity by the magnitude of its deflection variation when the cartridge (30, 31) is rotated. An aligning device (4) that is preferably also provided allows to exert a lateral pressure on the projectile in order to obtain an improved concentricity.

30 Claims, 5 Drawing Sheets

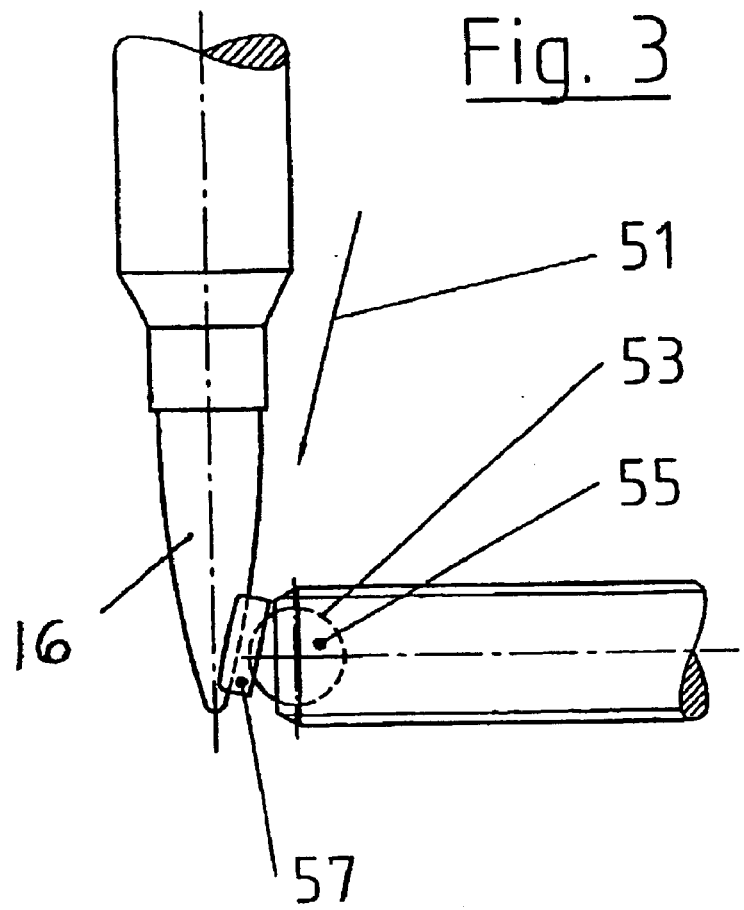
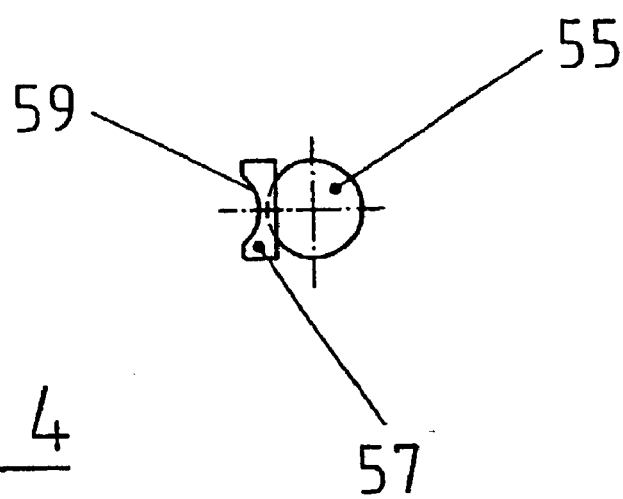

MEASURING TOOL AND ADJUSTING TOOL FOR AMMUNITION

CROSS-REFERENCE TO RELATED PATENT APPLICATIONS

This application is a continuation-in-part of U.S. patent application Ser. No. 10/158,043, filed May 28, 2002, to which the benefit of priority is claimed.

FIELD OF THE INVENTION

The invention refers to a device for measuring the concentricity of a projectile with respect to the case body of a cartridge, more particularly of a rifle cartridge.

According to the latest findings confirmed by bench rest firing tests, an eccentricity of the projectile with respect to the case exceeding 0.025 mm will cause a deterioration of the firing precision that increases with the eccentricity. In this context, the eccentricity is defined as the angle between the longitudinal axis of the projectile and the case. Ideally, i.e. in the case of perfect concentricity, this angle is equal to zero.

BACKGROUND OF THE INVENTION

The reduced precision resulting from the eccentricity not only affects the marksman in bench rest shooting. On the contrary, the various types of ammunition, all those applications are concerned where an absolute precision is an indispensable condition for the marksman, such as precision sports shooting, especially medium or long distance, as well as applications in public or private security or in hunting.

Known apparatus for controlling and correcting the concentricity of a cartridge, i.e. essentially for aligning the projectile with respect to the case, only allow a rudimentary concentricity control and do not take account of the actual position of the cartridge in the cartridge chamber of a firearm.

SUMMARY OF THE INVENTION

It is an object of the invention to provide a device allowing the measurement and preferably also the alignment of the projectile of a cartridge in order to achieve an improved firing accuracy.

This is accomplished by a device wherein the device comprises a main body having at least one chamber for the cartridge, the chamber includes means for retaining the cartridge by pressing it against a wall of the chamber such that the cartridge remains rotatable, and an access is provided through which a measuring means is capable of contacting the projectile of the cartridge, such that the concentricity of the projectile with respect to the case body is measurable in rotating of the cartridge. Preferred embodiments are described in the remaining claims.

Accordingly, the device essentially imitates the positioning of a rifle cartridge in the cartridge chamber in order to detect concentricity errors of the projectile of the cartridge with respect to its case. In a preferred embodiment, excessive concentricity errors can be corrected by a correcting device.

According to a preferred embodiment, the device is small and inexpensive in manufacture, thus making it suitable for universal applications and easy transport by the marksman. Most preferably the device is in the form of a hand-held tool.

Other preferred embodiments are defined in the claims.

BRIEF DESCRIPTION OF THE DRAWINGS

The invention will be further explained by way of example with reference to a preferred embodiment illustrated in the figures.

FIG. 3 shows a side view of an improved aligning point;

FIG. 4 shows a view of the push piece according to arrow 51 in FIG. 3;

DETAILED DESCRIPTION OF THE PREFERRED EMBODIMENTS

Figure 1:
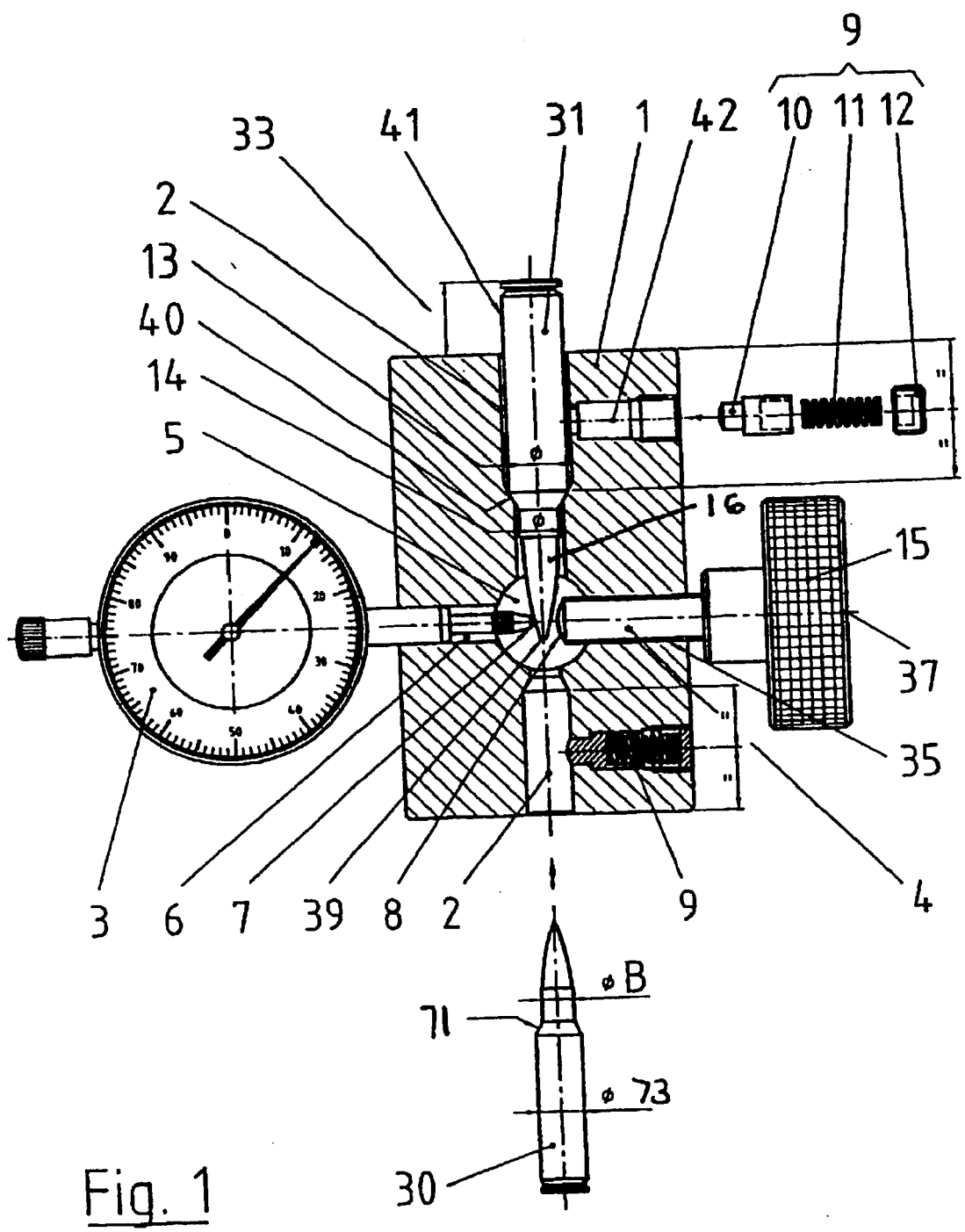
FIG. 1 shows the main body of a device according to the invention in a longitudinal section.
Figure 2:
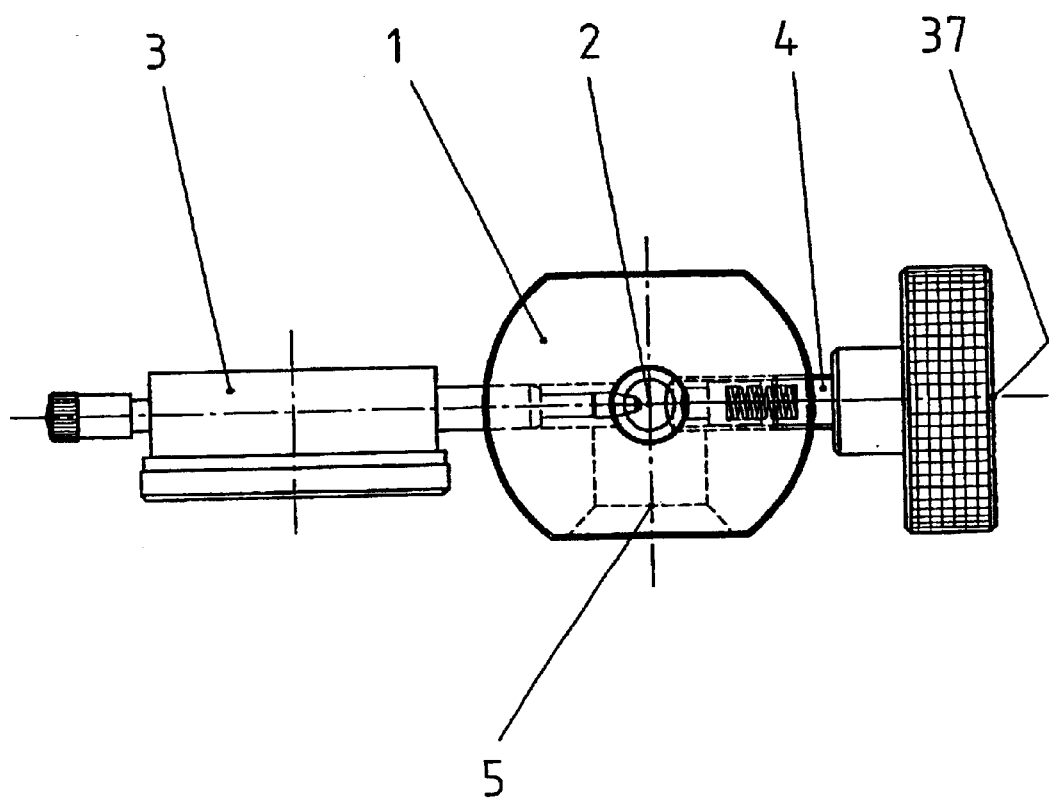
FIG. 2 shows a top view of the device of FIG. 1.

The cylindrical main body 1 of the device is preferably made of a shock-resistant plastics material having good sliding properties. Two cartridge chamber imitations 2 of different calibers are provided in the main body in the form of central longitudinal bores.

The cartridge chamber imitations 2 are so designed that cartridges 30 (smaller caliber) and 31 (larger caliber) inserted for concentricity control and adjustment project from the front sides of the main body 1 by a distance 33 that allows the manual rotation of the cartridges 30, 31 required for measuring and adjusting purposes.

A location bore 6 for a commercially available dial gauge 3 is provided in the main body 1 and extends transversally to the cartridge chamber imitations 2. Due to a close fit, the dial gauge 3 is self-adhesive in the location bore 6 but freely displaceable and freely rotatable in order to allow optimum readability. Aligning device 4 includes a threaded bore 35 intended for aligning screw 37 is disposed coaxially opposite the location bore 6 of the dial gauge 3, the aligning screw 37 essentially consisting of handle portion 15 and a threaded spindle.

The position of the dial gauge 3 and of the aligning screw 37 in the main body 1 is such that the inserted cartridge 31 can be measured (measuring point 7 of the dial gauge 3) and aligned (spindle point 8) in the area of projectile point 39.

In the context of the present invention, the difference between the minimum and the maximum reading of the dial gauge 3 during rotation of the cartridge 30, 31 will be used as a measure of the concentricity error. Since the dial gauge 3 measures the excursion of projectile 16 near its point, this value is approximately equal to the diameter of the circle described by the projectile point 39 during rotation of the cartridge 30, 31 around the longitudinal axis of the case.

In order to compensate for existing differences in the diameters of the cartridge 30, 31, the cartridge chamber imitations 2 in the main body 1 are designed with larger diameters than the respective cartridge, namely 1 to 2% larger than the theoretical case body diameter in area 13 of case body 73 and approx. 10% larger than theoretical case neck diameter B in area 14. Throat 40, located between areas 13 and 14, serves as a rest for cartridge shoulder 71 and thus as a stop when inserting the cartridge 30, 31 in the cartridge chamber imitation 2.

By means of diameter compensators provided in the main body 1 on the side of the aligning screw 37 and in the center of the cartridge chamber imitations 2, and composed of end cap 12, spring 11, and sliding piece 10, the cartridges 30, 31 are maintained in the chambers 2 in such a manner that the cartridges 30, 31 are manually rotatable in the cartridge chamber imitations 2 under an even and adjustable tension. Stepped bores 42 for compensators 9 are preferably provided on the side of the aligning screw 37 between the respective rear end of the cartridge chamber imitation 2 and the throat 40.

An opening, in the present example in the form of a blind bore 5, extending towards the center of the main body 1 and located at the same height as the bores for the dial gauge 3 and the aligning screw 37, however offset therefrom, serves as a viewing window and allows an additional, but not indispensable, visual control of the measuring and aligning operations.

Especially in the case of larger calibers, e.g. ammunition of caliber 10.3×60R, depending on the case structure, greater aligning forces are required. These may cause a slight deformation of the projectile 16 at the contact surface between the aligning point and the projectile 16. The resulting rotational eccentricity affects the firing precision. In particular, this may be the case with projectiles where a relatively soft core is enclosed in a think jacket.

This problem is solved by the embodiment illustrated in FIGS. 3 and 4.

Aligning point 8 contains a seat 53 for a ball 55 to which a thrust plate 57 is affixed. FIG. 4 shows a projection of the ball 55 and the plate 57 according to arrow 51 (FIG. 3). It is visible that the thrust plate 57 comprises an approximately cylindrical depression 59. In particular, the depression 59 may also be precisely adapted to the surface of the projectile 16 in the contact zone.

Otherwise, the measuring and aligning device 1 corresponds to the previously described embodiment.

The thrust plate 57 thus provides an enlarged engaging surface for the transmission of the aligning force to the projectile 16. Practical tests have shown that a deformation of the projectile 16 is excluded when this thrust point is used.

A further advantage of this embodiment of the aligning point consists in that the rotational movement now occurs between the ball 55 and the seat 53 in the aligning point, whereas the point rolls on the projectile surface in the simple embodiment.

A measuring and aligning procedure will be described in the following: The aligning device allows exertion of a lateral pressure on the projectile 16 in order to improve concentricity. The cartridge 31 is inserted in the cartridge chamber imitation 2 of the corresponding caliber. The dial gauge 3 is inserted in the bore 6 until the measuring point 7 contacts the point 39 of the projectile 16. The projecting end 41 of the cartridge 31 is seized between thumb and index finger and rotated at least 360°, meanwhile determining the total deflection of the dial gauge 3, i.e., the difference between the minimum and the maximum reading of the measuring gauge. The cartridge 31 is further rotated until the dial gauge 3 reaches the minimum reading that corresponds to the maximum deflection of the projectile point towards the aligning point 8.

Rotation of the aligning point 8 by means of the knob 15 will result in a pressure acting on the point 39 of the projectile 16, thereby deflecting it to such an extent that the point 39 of the projectile 16 remains laterally deflected from its original position by half of the total deflection of the dial gauge 3 when the aligning point 8 is lifted off. The aligning operation is then completed.

It will further be noted that the device of the invention also allows the user to detect and single out cartridges whose case is deformed or damaged or whose total length excessively deviates from the ideal value due to a different setting depth.

Figure 5:
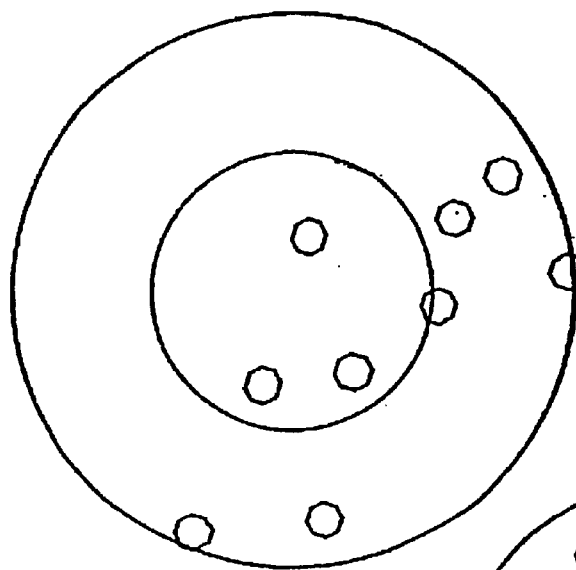
FIGS. 5–7 shows target diagrams.
Figure 6:
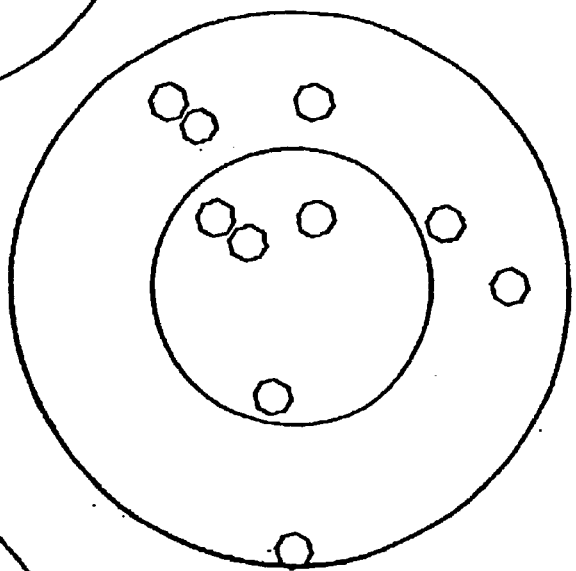
Figure 7:
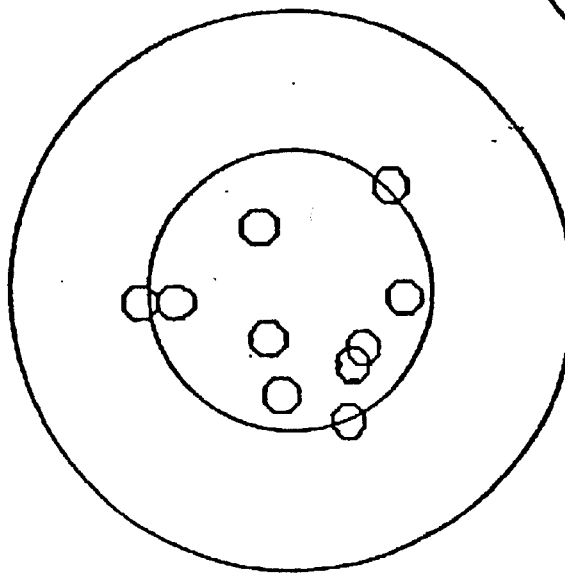

The target diagrams of FIGS. 5 to 7 illustrate the effect of the alignment of the cartridges 30, 31 by means of the device 1 of the invention. The illustrations correspond to target diagrams obtained by firing a rifle fixed in a holding device on a distance of 300 m. The inner target circle had a diameter of 50 mm. FIG. 5 shows the diagram obtained with the cartridges 30, 31 having a concentricity error of 0.1 to 0.18 mm, FIG. 6 shows the target diagram obtained with a concentricity error of less than 0.1 mm, and FIG. 7 shows the target diagram in the case of a concentricity error of no more than 0.03 mm. The comparison of FIGS. 5 and 6 already shows a noticeable concentration of the hits in the target center, while FIG. 7 shows a distinct improvement of the firing accuracy. It will be understood that a concentricity error of no more than 0.03 mm, as in the case of the cartridges 30, 31 used for target diagram FIG. 7, can only be achieved by aligning the cartridges 30, 31 in the device 1 of the invention, while the cartridges 30, 31 having concentricity error of up to 0.1 mm may still be obtained by measuring and singling them out, for which purpose the cartridge measuring device 1 of the invention is advantageous as well.

Figure 8:
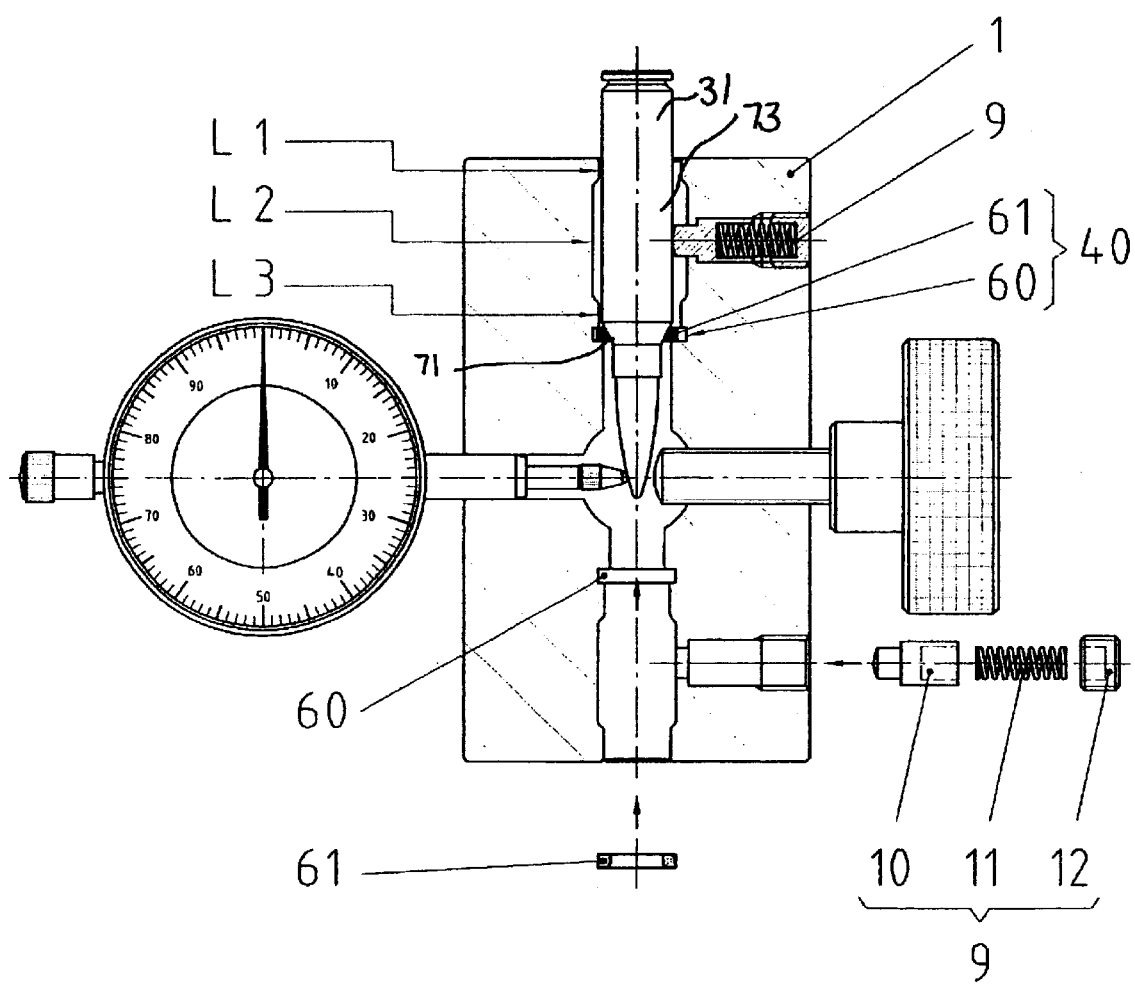
FIG. 8 is a sectional view of a device according to an alternate embodiment of the present invention, wherein a portion of the main body includes an additional clearance for the cartridge.

In an alternative embodiment of the invention and as shown in FIG. 8, the throat 40 of the device 1 comprises a shoulder insert 61 and a groove 60 positioned within the device. The groove 60 is manufactured with an enlarged diameter. The enlarged diameter of the groove 60 permits the shoulder insert 61 to freely move radially within the device 1. The contact point of the shoulder 71 of the case body 73 is centered upon the shoulder insert 61 through the existing radial play of the shoulder insert 61. Digressions in the total length of the cartridge 31 due to divergent projectile insertion depths can therefore be immediately identified through the readings from the dial gauge 3 and can be promptly sorted out from other cartridges.

As shown in FIG. 8 and in order to improve the preciseness of the measurement of a cartridge with an uneven cartridge case, the profile of the cartridge chamber imitation 2 within the device 1 is arranged such that the cartridge 31 inserted within the device 1, when pressed inward from the side by a compensator 9, only rests against the walls of the cartridge chamber imitation 2 within zones L1 and L3, with additional clearance in the L2 zone.

Modifications with respect to the preceding description are accessible to those skilled in the art without departing from the scope of protection of the invention as defined by the claims. For example, it is possible to position the aligning device and/or the measuring device in a location such that either device may contact and/or exert a lateral pressure on any portion of the projectile. Other conceivable options include:

- manufacturing the bore without including a clearance zone L2 or by using a different arrangement in zones L1 and L3;
- manufacturing the bore and the throat without a groove and without a shoulder insert;
- manufacturing the groove with a diameter to correspond with the precise outside diameter of the shoulder ring, resulting in a relative lack of axial play of the shoulder ring within the groove;
- manufacturing the bore with the contact points of the cartridge case located in other sections of the bore, such as the neck or the shoulder regions of the cartridge case;
- manufacturing the main body of a material other than plastics material;
- manufacturing a different shape of the main body, e.g. an essentially parallelepipedic shape;

incorporating more than one viewing window into the device;

incorporating viewing windows in the form of a through-going bore, thereby allowing an observation from both sides of the tool;

not incorporating a viewing window at all;

providing the device with a different number of cartridge chamber imitations, particularly also only one;

providing the diameter compensators in a different place than in the center of the section receiving the case body or in a different position than opposite the dial gauge;

incorporating a cross-section of the cartridge chamber imitations other than circular, e.g. a V-shaped cross-section with the point of the V opposite the compensator;

incorporating more than one diameter compensator per cartridge chamber imitation in the device;

incorporating a different deviation of the cartridge chamber diameters from the nominal diameter of the cartridges;

incorporating a cartridge chamber imitation in the form of an insert in the main body, the use of different inserts allowing the adaptation to different calibers;

using a measuring device other than a mechanical dial gauge, e.g., a gauge having a digital display and/or a signal or data output, e.g., for connection to a computer controlled measuring device;

using a motor-driven form of the aligning device 4, particularly in conjunction with a measuring device having a signal or data output, thereby allowing a nearly entirely automatic operation, e.g., according to the following sequence:

Insertion of cartridge;

Start of measuring operation;

Rotation of cartridge by at least a full turn in order to determine concentricity error;

Stop of measuring operation, rotational positioning;

Rotation of cartridge, possibly according to instructions from the measuring and aligning device, until position of maximum deviation of projectile towards aligning device is attained;

Stop of rotational positioning, start of aligning operation;

Advance of the aligning device 4 and deflection of projectile until measuring device detects a predetermined deflection, under control of measuring and aligning device;

Verification of concentricity error essentially by repeating the measuring procedure; and Motorized device for effecting the rotation of the cartridge (preferable if the measuring and aligning device is designed for automatic operation).

What is claimed is:

1. A device for evaluating the concentricity of a projectile with respect to a case body of a cartridge holding the projectile, comprising:

a main body having at least one hollow chamber adapted to receive said cartridge, the at least one chamber further adapted for holding and concentricity control of the cartridge further including a means for retaining said cartridge against a side of the at least one hollow chamber; and an access passage provided through the at least one hollow chamber, wherein the concentricity of the projectile with respect to the case body can be evaluated by rotating the cartridge in the at least one hollow chamber.

2. The device of claim 1, further including means for securing the cartridge against a wall of the chamber such that the cartridge remains rotatable in the chamber.

3. The device of claim 1, wherein the access passage comprises a bore through which a measuring point of a dial gauge contacts the projectile.

4. The device of claim 3, wherein the measuring point of the dial gauge contacts substantially all of one side of the portion of the projectile.

5. The device of claim 3, wherein the measuring point of the dial gauge may be positioned to contact any portion of the projectile.

6. The device of claim 1 further comprising a throat having a shoulder insert for receiving the cartridge and a groove such that the shoulder insert is freely movable radially within the groove.

7. The device of claim 6, wherein the groove has a diameter larger than the diameter of the immediately adjacent portions of the at least one chamber.

8. The device of claim 1, wherein the at least one chamber includes a nonuniform diameter such that a substantial portion of the cartridge that fits within the at least one chamber does not contact at least one wall of the access passage.

9. The device of claim 1, wherein the at least one chamber and the entire main body comprise a material having a low friction against the cartridge, in order to provide an easy rotation ability of the cartridge in the chamber.

10. The device of claim 1, further comprising an aligning device exerting a lateral pressure on the projectile of the cartridge inserted in the at least one chamber, permitting the projectile to be aligned with respect to the case body.

11. The device of claim 10, wherein the aligning device may exert a lateral pressure on any portion of the projectile.

12. The device of claim 10, wherein the aligning device comprises an aligning point capable of being pressed against the projectile of the cartridge inserted in the at least one chamber by actuating an operating means.

13. The device of claim 12, wherein the aligning device comprises a shank rotatably disposed in a thread of the main body, the shank having an end provided with the aligning point such that the aligning point is axially movable by rotating a shaft.

14. The device of claim 10, wherein the main body comprises a plurality of the at least one chamber for the cartridge, the plurality of at least one chamber being of different calibers and further wherein at least two of the at least one chamber are located such that the projectile inserted therein in each of the at least one chamber is in the correct position for carrying out a measurement for an alignment by the aligning device.

15. The device of claim 1, wherein the main body comprises a window allowing a visual observation of at least one of the projectile of the cartridge inserted in the at least one chamber.

16. The device of claim 1, wherein the main body comprises a plurality of the at least one chamber for the cartridge, the plurality of at least one chamber being of different calibers.

17. The device of claim 1 further comprising measuring means for contacting the projectile of the cartridge to measure the concentricity of the projectile.

18. The device of claim 1 further including a means for retaining said cartridge casing against a side of the chamber.

19. A device for measuring the concentricity of a projectile with respect to a case body of a cartridge comprising:

a main body of the device for holding a cartridge including a projectile an access port in the main body; and measuring means disposed through the access port and contacting the projectile of the cartridge, thereby enabling concentricity of the projectile to be measured relative to the case body of the cartridge during rotation of the cartridge;

wherein the cartridge is disposed in a substantially cylindrically shaped hollow chamber of the main body adapted to receive said cartridge, while the concentricity of the projectile is being measured, the hollow chamber including a throat comprising a groove and a shoulder insert within the groove for receiving the cartridge, the shoulder insert freely movable radially within the groove.

20. The device of claim 19, wherein the chamber includes a nonuniform diameter such that a substantial portion of the cartridge that fits within the chamber does not contact at least one wall of the access port.

21. The device of claim 19, wherein the chamber and the main body comprise a material having a low friction against the cartridge, in order to provide an easy rotation ability of the at least one cartridge in the chamber.

22. The device of claim 19, wherein the main body comprises a plurality of chambers for the cartridge, the plurality chambers being of different calibers.

23. The device of claim 19, wherein the main body comprises a window allowing a visual observation of the cartridge inserted in the chamber.

24. The device of claim 19, further comprising an aligning device exerting a lateral pressure on the projectile inserted in the one chamber, permitting the projectile to be aligned with respect to the case body.

25. The device of claim 24, wherein the aligning device may exert a lateral pressure on any portion of the projectile.

26. The device of claim 24, wherein the aligning device comprises an aligning point capable of being pressed against the projectile inserted in the at least one chamber by actuating an operating means.

27. The device of claim 26, wherein the aligning device comprises a shank rotatably disposed in a thread of the main body, the shank having an end provided with the aligning point such that the aligning point is axially movable by rotating a shaft.

28. The device of claim 19, wherein the measuring means may be positioned to contact any portion of the projectile.

29. A device for evaluating the concentricity of a projectile with respect to a case body of a cartridge holding the projectile, wherein said device comprises:

a main body having at least one hollow chamber for holding and concentricity controlling of said cartridge;

an access passage provided through the at least one hollow chamber, such that the concentricity of said projectile with respect to said case body can be evaluated by rotating said cartridge in said at least one hollow chamber, an aligning device to exert a lateral pressure on the projectile of the cartridge inserted in said an least one hollow chamber, thereby allowing said projectile to be aligned with respect to the case body, wherein said aligning device comprises an aligning point which presses against the projectile of the cartridge inserted in said at least one hollow chamber by actuating an operating means.

30. The device of claim 29, wherein the aligning device comprises a shank that is rotatably disposed in a thread of the main body and whose end is provided with an aligning point such that the aligning point is axially movable by rotating a shaft.

* * * * *